United States Patent [19]

Eisdorfer et al.

[11] Patent Number: 5,475,733
[45] Date of Patent: Dec. 12, 1995

[54] LANGUAGE ACCOMMODATED MESSAGE RELAYING FOR HEARING IMPAIRED CALLERS

[75] Inventors: Jerry Eisdorfer, Somerset; Leonard R. Kasday, Moorestown, both of N.J.; David E. Schulz, Wheaton, Ill.

[73] Assignee: AT&T Corp., Murray Hill, N.J.

[21] Appl. No.: 299,937

[22] Filed: Sep. 1, 1994

Related U.S. Application Data

[63] Continuation-in-part of Ser. No. 147,391, Nov. 4, 1993.
[51] Int. Cl.$^6$ .................................................. H04M 11/00
[52] U.S. Cl. ........................ 379/52; 379/266; 340/825.19
[58] Field of Search .................................. 379/52, 96–99, 379/93, 210–212, 214, 265, 266, 309, 218, 67, 89, 155, 143; 340/825.19

[56] References Cited

U.S. PATENT DOCUMENTS

| | | | |
|---|---|---|---|
| 5,014,301 | 5/1991 | Maltezos | 379/155 |
| 5,163,081 | 11/1992 | Wycherley et al. | 379/52 |
| 5,289,523 | 2/1994 | Vasile et al. | 379/52 |
| 5,309,513 | 5/1994 | Rose | 379/266 |
| 5,333,180 | 7/1994 | Brown et al. | 379/67 |
| 5,375,164 | 12/1994 | Jennings | 379/89 |

OTHER PUBLICATIONS

D. G. Schmitt et al., "An Experimental Study of Synthesized Speech Intelligibility Using Text Created by Telecommunication Device for the Deaf (TDD) Users," IEEE, 1990.

*Primary Examiner*—Wing F. Chan

[57] ABSTRACT

A call between a caller using a telephone device for the deaf (TDD) using a one of a number of languages and another including a TDD user is connected by automatically prompting the TDD caller for calling information, automatically identifying the language being used, parsing the received calling information in the appropriate language to determine a forward number, selecting a communication assistant (CA) capable of speaking in the language routing the call to the selected CA, and connecting the call. One embodiment involves storing the forward number before routing the call so the selected CA can press a single button to connect the call. According to an embodiment of the invention, the calling information is passed directly to a number of language specific parsers and the successful parser determines the language being used.

19 Claims, 7 Drawing Sheets

FIG. 7

LANGUAGE ACCOMMODATED MESSAGE RELAYING FOR HEARING IMPAIRED CALLERS

This is a continuation-in-part of copending application Ser. No. 147,391, filed Nov. 4, 1993 and assigned to the same assignee as this application. (Millios 1—1).

BACKGROUND OF THE INVENTION

This invention relates to methods and means for relaying calls between hearing impaired telephone callers using TDD (Telecommunications Device for the Deaf) or ASCII (a computer protocol) technology and other users including voice users, and particularly to calls accommodating such calls to different languages that a caller may use.

In present systems, a communications assistant (CA) at a relay station provides telecommunication relay service (TRS) by translating signals from a hearing-impaired caller using a TDD or ASCII and another party using voice.

With current technology, a hearing impaired person initiates a TDD call with a keyboard having an alphanumeric display or a printer and the call arrives at a relay center. A PBX (post branch exchange) routes the call to a CA, i.e. a communications assistant or a communications attendant or operator, who now stops all other work. A modem at the CA position auto-answers and attempts to synchronize with the caller. After synchronization, the modem plays a prompt such as "TRS HERE CA 1234 GA". The latter identifies the communication assistant's number such as 1234 and gives a signal such as GA meaning "go ahead". This process consumes about ten seconds on the average, and wastes ten seconds of the communication assistant's time. The caller now supplies the forward number, i.e. the number to call, plus special billing information, if any. A typical caller response would be "PLEASE CALL 708 555-1212 GA". On the average, it takes twenty to 30 seconds for the caller to type this information. The fastest callers complete this initial transaction in about five seconds. The slowest can take several minutes. The communication assistant can do nothing until the caller types "GA". This involves a waste of the CA's time.

After the caller types "GA" the CA types the forward number and billing information into a billing record and then manually dials the call. This constitutes the first useful work that the CA has done on this call. A minimum of fifteen seconds has been wasted, but on the average about 30 to 40 seconds are wasted waiting for the caller's "GA". This occurs on every ASCII or TDD originated call. The total accumulated time wasted in connected calls is substantial.

It is only after the communications assistant receives the GA signal that communication assistant performs the useful work of translating between TDD signals and voice signals.

U.S. Pat. No. 5,157,559 discloses a text-to-speech synthesizer that grammatically parses the text received from a hearing impaired party after the operator or CA has connected the call. This system is quite complex and still requires the operator for connecting the call.

The co-pending application Ser. No. 147,391, filed Nov. 4, 1993, improves this situation by automatically prompting a TDD caller for calling information, grammatically parsing received calling information to determine a forward number to one of a number of calling assistants for automatic dialing by the assistant.

According to another aspect of the copending application, the parser program or subroutine looks for a signal that the grammatical input has been terminated by a go ahead signal, for example "GA", and when finding one, signals to route the call to the next available assistant.

Such arrangements operate exceedingly well if all callers speak one language, i.e. the most common language, as English. However when a significant number of callers employ other languages such as Spanish, problems arise. CAs that speak the other language or are multilingual are a special resource that should be used efficiently. An oversupply of other-language CAs or multilingual CAs is wasteful. On the other hand, using a scarce resource for English, for routing callers to the right CA is also wasteful.

An object of the invention is to improve methods and means for handling such calls.

Another object of the invention is to avoid the aforementioned problems.

SUMMARY OF THE INVENTION

According to an aspect of the invention, these objects are attained by automatically prompting a TDD caller for calling information, automatically analyzing the received calling information in a language-identifying parsing routine, selecting a communication assistant capable of using the identified language; and routing the call to the selected communication assistant.

These and other aspects of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
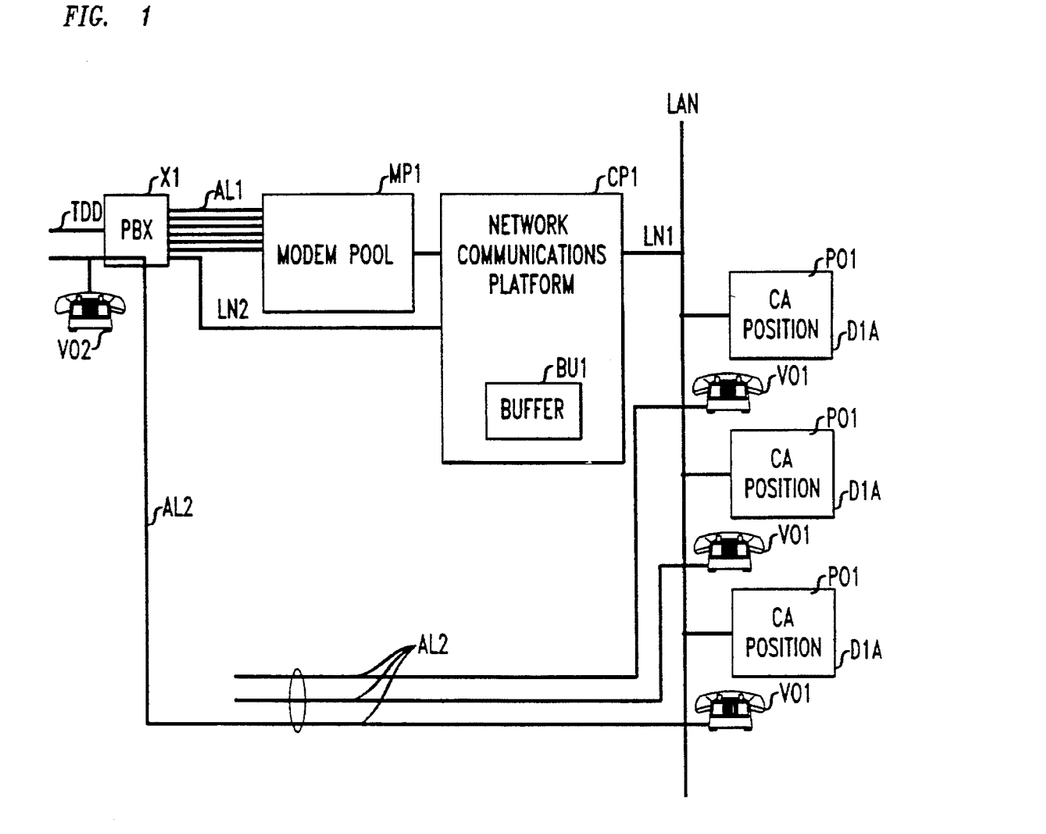
FIG. 1 is a block diagram of the architecture of a relay station embodying features of the invention.

FIG. 1 illustrates the architecture of a telecommunications relay system embodying features of the invention. Here, a PBX X1 receives calls and passes them along a number of analog lines AL1 to a modem pool MP1 which may, for example, have 128 modems. A network communication platform CP1 in the form of a set of processors receives data from and sends data to the modem pool MP1. After processing the data, the network communications platform CP1 passes data to the lines LN1 of a local area network to a number of CA positions PO1 in the form of processors with displays DI1 and voice sets VO1. The platform CP1 also receives data from the PBX X1 through a line LN2.

The network communications platform CP1 routes the calls between the analog lines AL1, the modems of the modem pool MP1, the line LN1, and the CA positions PO1, as well as back from the positions PO1 to the modem pool and the analog lines. The line LN2 controls the PBX and causes it to route calls. The PBX X1 also connects the voice sets VO1 at the CA positions PO1 directly with outside callers' voice sets VO2 for voice communication with voice callers.

In FIG. 1, a TDD or ASCII call arrives at the PBX X1. The network communications platform CP1 routes the call to the modem pool MP1. The network communications platform CP1 then automatically answers the line and plays a prompt such as "TRS here GA". This means that the telecommunications relay service is answering "please go ahead". In contrast to existing technology, the network communications platform CP1 does not display a CA identification because it is not yet known which CA will receive the call. Moreover, the automatic prompt does not specifically request particular information. Callers already know after the greeting that they should indicate whom they wish to call. This avoids intimidation of the caller with questions and interactive computer transactions which may lead to error and frustration. The system allows the callers to provide the information about what they want in their own way. However, this freedom on the part of the caller results in the information which may not follow any specific pattern.

In response, the caller types back billing and forward number information such as "PLS CALL 708 555 1212 GA". Each character enters an input buffer BU1 in the network communications platform CP1. The processor of the communications platform CP1 invokes a parser program or subroutine which parses the present content of the input buffer BU1 after every character that is typed. The parser program looks for a "grammatical" input terminated by "GA". When it finds one it signals the platform CP1 and the platform routes the call to the next available CA position PO1.

If the parser program has successfully parsed the input, the CA need only press a single "dial" button and the communications platform CP1 automatically dials the forward number. The platform automatically types the CA identification number and a dialing message back to the caller. A typical transaction here reads "CA 1234 DIALING . . . ". After the call is complete, the relay proceeds in the usual manner with the CA translating between the calling party and the called party.

A parser program stores a lexicon of words which the system expects the caller or other user to employ together with the parts of speech each word or "token" represents. The parsing program also contains a built-in grammar based upon expected use of the word. The parsing program determines whether a given input conforms to that grammar, i.e. whether the input is grammatical. It accomplishes this by matching the cases of the words or tokens of the input to the grammar. Accordingly, the parser program must initially store a grammar suited for the particular expected input text. To accomplish this storage, we establish a context free grammar that describes the type of expected input. Parser programs and their use are known and are described, for example, in "Principles of Compiler Design" by Alfred V. Aho and Jeffrey D. Ullman, published by Addison-Wesely, Reading Mass., copyright 1977 by Bell Laboratories, Inc. An off-the-shelf parsing program is called "yacc" and is part of the tool distribution that accompanies the system called UNIX. Another is called "lex". U.S. Pat. Nos. 5,157,559; 5,146,405; 5,129,013; 5,056,104; 5,020,112; 4,636,939; and 4,446,341 also disclose parsing systems. The aforementioned Aho and Ullman publication, the yacc and lex programs, and the aforementioned patents are hereby made a part of this disclosure as if fully recited herein.

Figure 2:
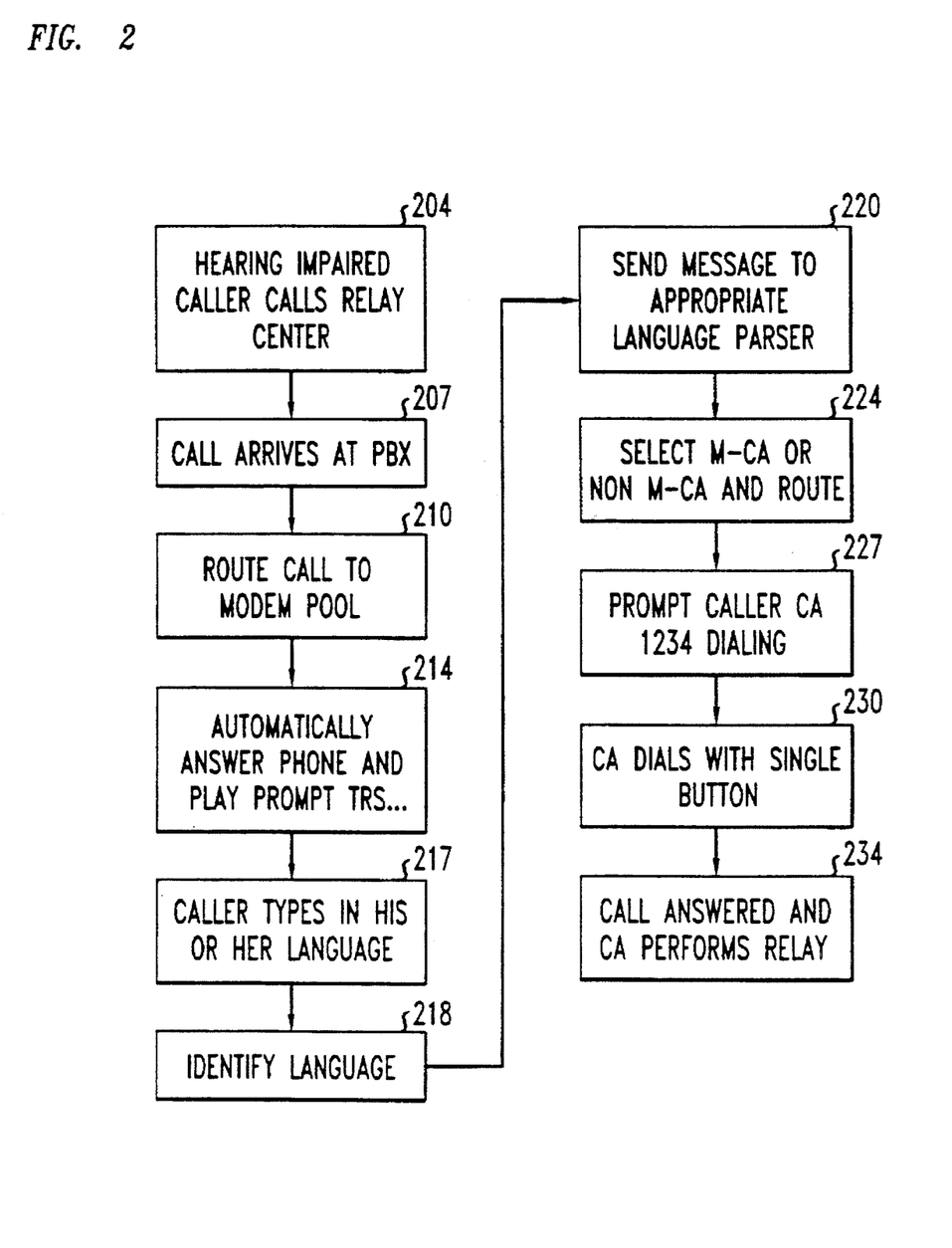
FIG. 2 is a flow chart of steps performed by the structure in FIG. 1 in accordance with an embodiment of the invention.

FIG. 2 illustrates detailed steps performed by the platform CP1 in FIG. 1. There, in step 204, the hearing impaired caller calls the relay center of FIG. 1. In step 207, the call arrives at the PBX. In step 210, the platform CP1 then routes the call to a modem in the modem pool MP1. In step 214, the platform CP1 then automatically answers the phone and plays a prompt such as "TRS here GA". In step 217, the caller then responds by typing a request such as "PLS CALL 708 713 5260 GA" or "QUEIRO LLAMAR AL 708 713 5260 GA". In step 218 the message goes to the language determination module which identifies the language as English, Spanish, etc. Details of language determination steps appear in FIG. 6. In step 220 the platform CP1 sends the message to the particular one of a group of language parsers which parses the language the caller is using. It then uses the appropriate one of the group of language-specific (English, Spanish, etc.) parsers to perform the appropriate determined parsing subroutine or program for analysis. Thereafter, in step 224, the platform CP1 determines if a calling attendant CA speaking the language determined in step 218 is available and routes the call to an appropriate language speaking calling attendant CA, if available with billing information automatically supplied by the parsing program. Details of the determination and selection of the appropriate language-speaking CA appears in FIG. 7.

Then, in step 227, the platform CP1 through the analog lines AL1 prompts the caller with a message in the appropriate language. In English a message would be "CA 1234 DIALING...". In step 230, the CA dials with a single button. In step 234, the call is answered and the CA performs the usual relay translation.

Figure 3:
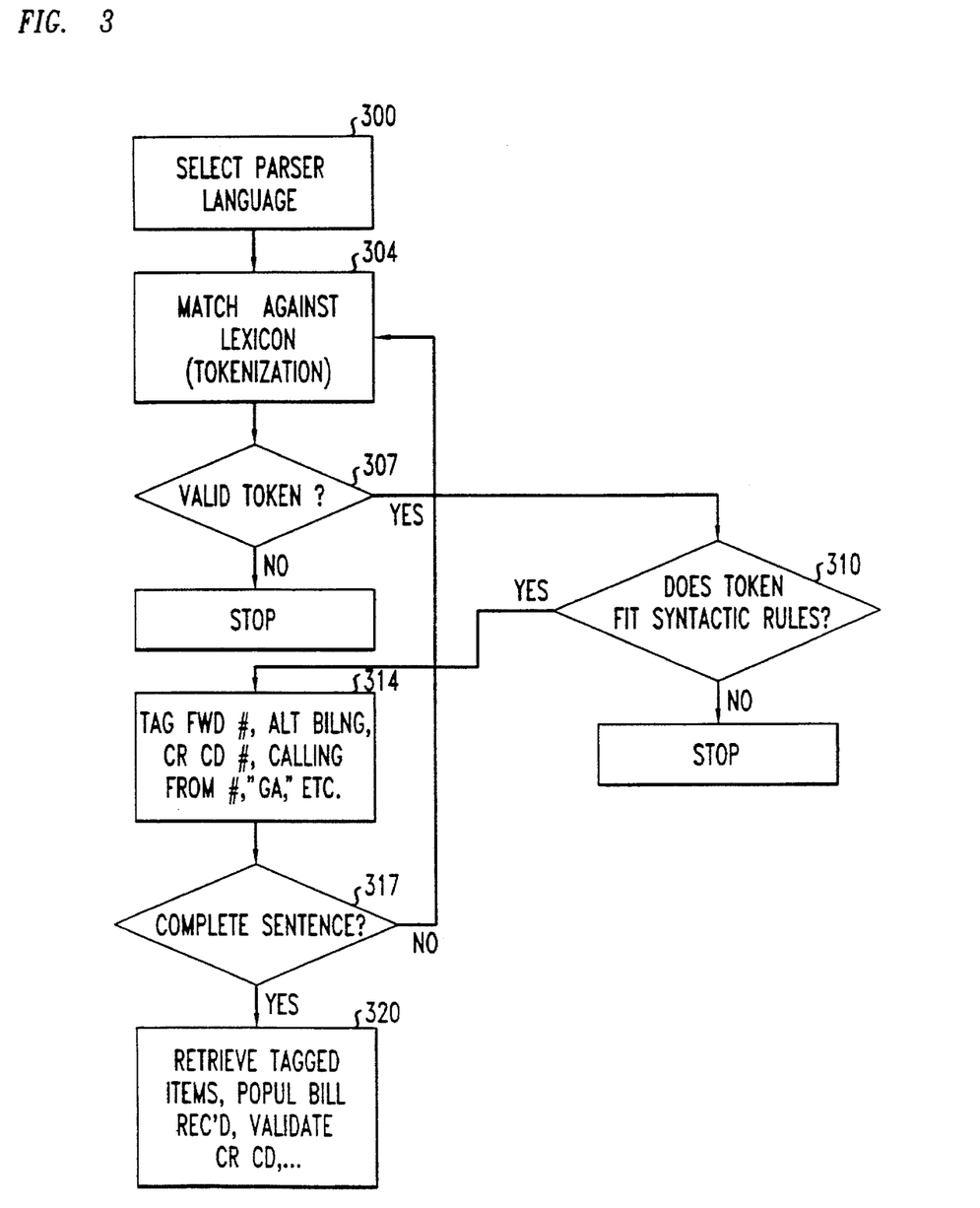
FIG. 3 is a flow diagram of steps performed by the system of FIG. 1 for parsing messages from a caller and embodying the invention.

Details of the parsing operation of step 220 appear in FIG. 3. Details of step 218 for identifying the language being used appear in FIG. 6. Details of step 224 for the determination and selection of the appropriate language speaking communication assistant (CA) appear in FIG. 7.

Figure 6:
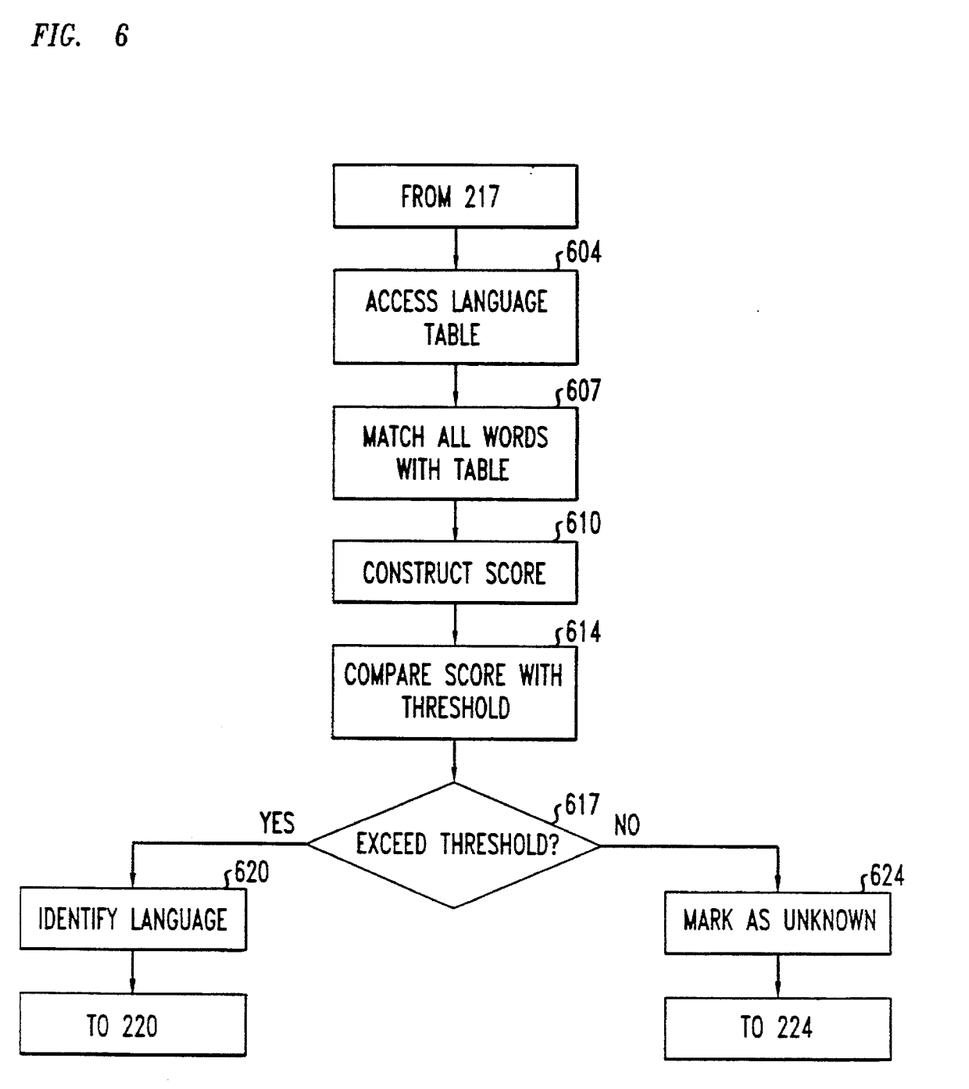
FIGS. 6 and 7 are flow charts showing details of steps performed in FIG. 2 and embodying the invention.

As shown in FIG. 6, the platform CP1 determines the language being used (step 218) by accessing data from a previously constructed language table TA1 (in the platform CP1) of all expected keywords from each language being supported. This occurs in step 604.

For example for English and Spanish the table TA1 includes at least the following words:

| English | Spanish |
| --- | --- |
| Number | Numero |
| I | Yo |
| My | Mi |
| Our | Nuestro |
| Phone | Telefono |
| Please | Por Favor |
| Call | Llamar |

In step 607, the platform CP1 matches every input word from the caller against all the words in the language table. In step 610 the platform CP1 constructs a score in the form a probability table. For example 90% likely to be English, 40% likely to be Spanish, etc. In step 614, it compares the score with a threshold such as 85%. In step 617 it asks if any language score exceeds the threshold. If yes, i.e. a score exceeds the threshold, the platform CP1 identifies the language in step 620 and proceeds to step 220 in FIG. 2. If no, or if more than one language exceeds the threshold, the platform CP1 marks the language as unknown in step 624, and proceeds to step 224.

Scoring allows for misspelled words. In one embodiment of the invention, a word is counted as matching a word in the table if it differs by no more than 3 "differences" e.g. insertions, deletions, or changes of a letter. However points are deducted from the score for each difference. The spellings are corrected where possible for parsing.

The platform CP1 contains a parser program for each language it supports. To construct the parser program in any language requires creating a corpus of sample input text based upon expected transactions with customers. Such program creation involves avoiding actual names and phone numbers. For example, expected transactions in the English language, such as "PLS CALL DAVE AT (708) 713-5260 OK GA" are rendered as "PLS CALL PNAME AT (XOX) XXX-XXXX OK GA" to permit the use of any name and number. The corpus is analyzed to create a context free grammar. The parser subroutine, such as disclosed in the aforementioned Aho and Ullman book and the previously mentioned patents, operates on this context free grammar that accounts for most of the corpus. The parser subroutine parses the context free grammar and is in the form of standard compiler tools, such as lex or yacc. A typical rule in the grammar is:

S→CALL_VERB TO_NUMBER GA
TO_NUMBER→AREA_CODE-NXX-XXXX

Another embodiment of the invention uses a finite state grammar instead of a context free grammar to describe this subset of English or any other language. However, a context free grammar is intrinsically more powerful or at least more easily constructed.

The parser subroutine in the English language takes the form of lex, yacc, or other C codes and takes as input a buffer of text and produces as output a "success" or "failure" indication. In the case of success, it populates a billing record with all the information it extracted. The grammar looks for forward and back numbers, although back numbers hardly ever occur. It looks for key words such as "collect", "person-to-person", "credit card", etc. It looks for credit card numbers. The formats of all credit cards normally accepted are known. A valid credit card number always permits determination of the issuer, e.g. Visa, Amex, Diners, etc. of card. Phone numbers which exist have seven digits, ten digits, (seven plus area code), eleven digits (seven plus area code plus 1) or multi-digit international numbers which start with 011. The parser subroutine accepts all methods of presentation such as combinations of spaces, dashes, parentheses, etc. The grammar is easily updated to cover cases that have been missed or to add new applications.

FIG. 3 illustrates the steps of the parsing process in step 220 of FIG. 2. Here, in step 300, the platform CP1 first selects the parser for the identified language. In step 304 the selected parser matches the input against the stored lexicon. This is called "tokenization". In step 307 it determines whether the token or word is valid, i.e. in the lexicon. If not, the parsing stops and the program routes the call to the CA. If valid, in step 310, it asks whether the token fits into the syntactic rules of the grammar. If not, the parsing stops and the call is routed to the CA; if it fits, the program goes to step 314. Here, the subroutine looks for and tags a forward number. The number may be seven, ten, or eleven digits, or may be international. All valid combinations are accepted such as 555-1212, 555 1212, 1 708 5551212, 1 (708) 555 1212, etc. In step 314, the parser subroutine also looks for and tags an alternate billing number and looks for and tags a credit card, collect, person-to-person, and third number. The parser subroutine in step 314 also looks for and tags a "calling from" number which is usually supplied by the PBX, and looks for a terminator such as "GA".

In step 314, when the parser subroutine looks for the "calling from" number which originated the call, the latter is usually supplied automatically by the PBX. In step 317, the parser subroutine determines if this is a complete sentence as decided by the grammar. If not it returns to step 304 for the next entry. If it is a complete sentence, it goes to step 320 and retrieves all tagged items. It then populates a billing record with the forward number, the billing method, the credit card number, and calling number if present. The process then continues with step 224 which selects the language appropriate CA and routes the call. If the parsing is unsuccessful, step 224 also selects the language appropriate CA and routes it for attention.

Figure 7:
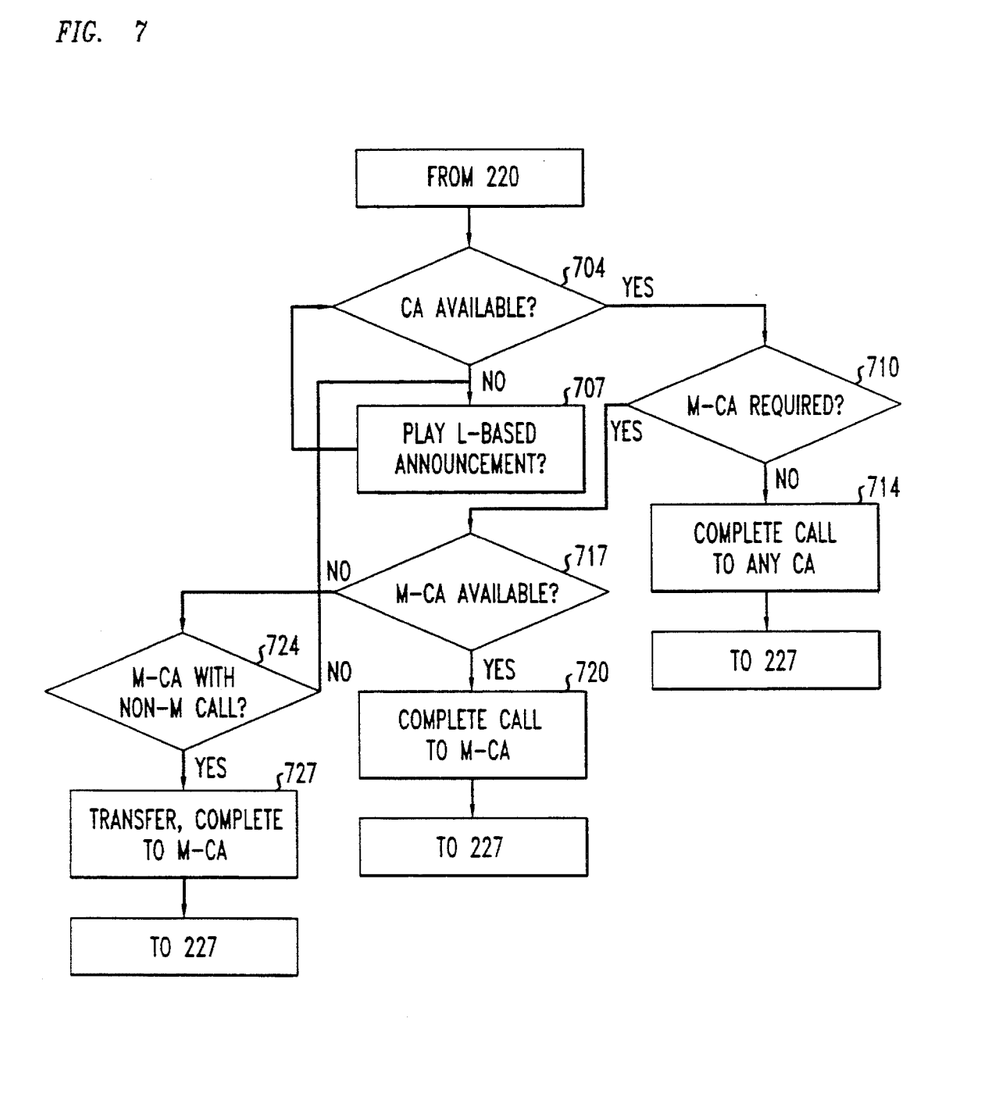

Details of step 224 for finding and routing to a language appropriate CA appear in FIG. 7. Here, in step 704, the platform CP1 inquires to determine if any communication assistant (CA) is available. If no, the platform CP1 in step 707 plays the language based announcement and returns to step 704. If yes, the platform CP1 in step 710 inquires if a multilingual communication assistant (M-CA) is required. If no, the platform CP1 in step 714 completes the call to a non-multilingual (non-M) CA or to an M-CA that has been idle the longest. It then proceeds to step 227. If yes, the platform CP1 asks, in step 717, if an M-CA is available. If yes, in step 720, the platform completes the call to an available M-CA that has been idle the longest. It then proceeds to step 227. If the answer in step 717 is no, the platform CP1 proceeds to step 724 to determine if an M-CA is occupied with a non-M call. If no, the platform CP1 passes back to step 707. If yes the platform CP1, in step 727 transfers the existing non-M call to a non-M CA; and completes the M-call to the M-CA. The process now goes to step 227.

In steps 714, 720, and 727, billing information is automatically supplied by the parser.

Figure 4:
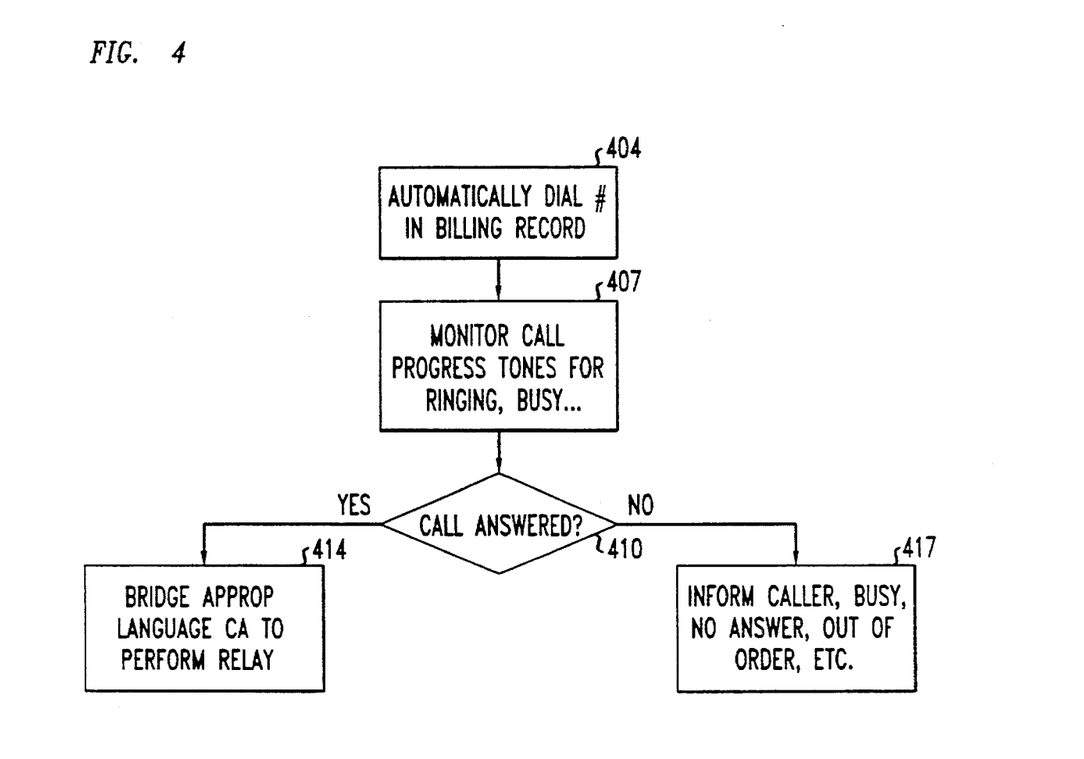
FIG. 4 shows steps performed in the structure of FIG. 1 and embodying the invention for automation of voice originated relay calls.

According to another embodiment of the invention, in step 224, the program automatically places the call by dialling the forward number. Then, instead of continuing with steps 224 to 234 of FIG. 2, the platform CP1 proceeds as shown in FIG. 4. In step 404, the platform CP1 automatically dials the number in the billing record. Thereafter, in step 407, the platform CP1 monitors the call progress tones automatically for ringing, busy, reorder, etc.

In step 410, the platform CP1 then asks whether the call has been answered. If yes, the call proceeds to step 414 and the platform CP1 bridges a CA at one of the positions PO1 onto the call to perform the relay in accordance with FIG. 7. If the answer is no, that is, the line is busy, out of order, or gives no answer, the platform CP1 in step 417 informs the caller automatically and no CA is needed unless requested. Because a large number of calls are either busy or give no answer, the use of the steps in FIG. 4 reduces the overall work time by avoiding use of the CA's for calls that cannot be completed.

In FIG. 4, when the operation is successful, the system automatically dials the forward number and places a "call progress tone detector" on the line. In the case of a busy, the platform automatically informs the caller that the line is busy. This is also so, in the case of no answer. In the case of an answer, the platform CP1 recognizes the answer and method of answer, e.g. voice or baudot or ASCII. Baudot is a communication protocol used by TDD's and constitutes a series of tones with no carrier. ASCII is a modem to modem communication protocol. In the case of a baudot or ASCII answer, the platform CP1 plays a greeting to the forward party and then connects a communication assistant to the line. In the case of voice answer, the platform will connect a CA to the line immediately.

The system according to the invention is completely invisible to subscribers as long as the parsing works correctly. The arrangement requires no explicit cooperation or concession on the part of subscribers. If the system is loaded to the point that there are no CA's available but there are available modems, the connection will take place, but after the caller types "GA" a delay occurs in getting an operator. If this delay exceeds a certain threshold, the platform CP1 plays a "please hold" message.

Figure 5:
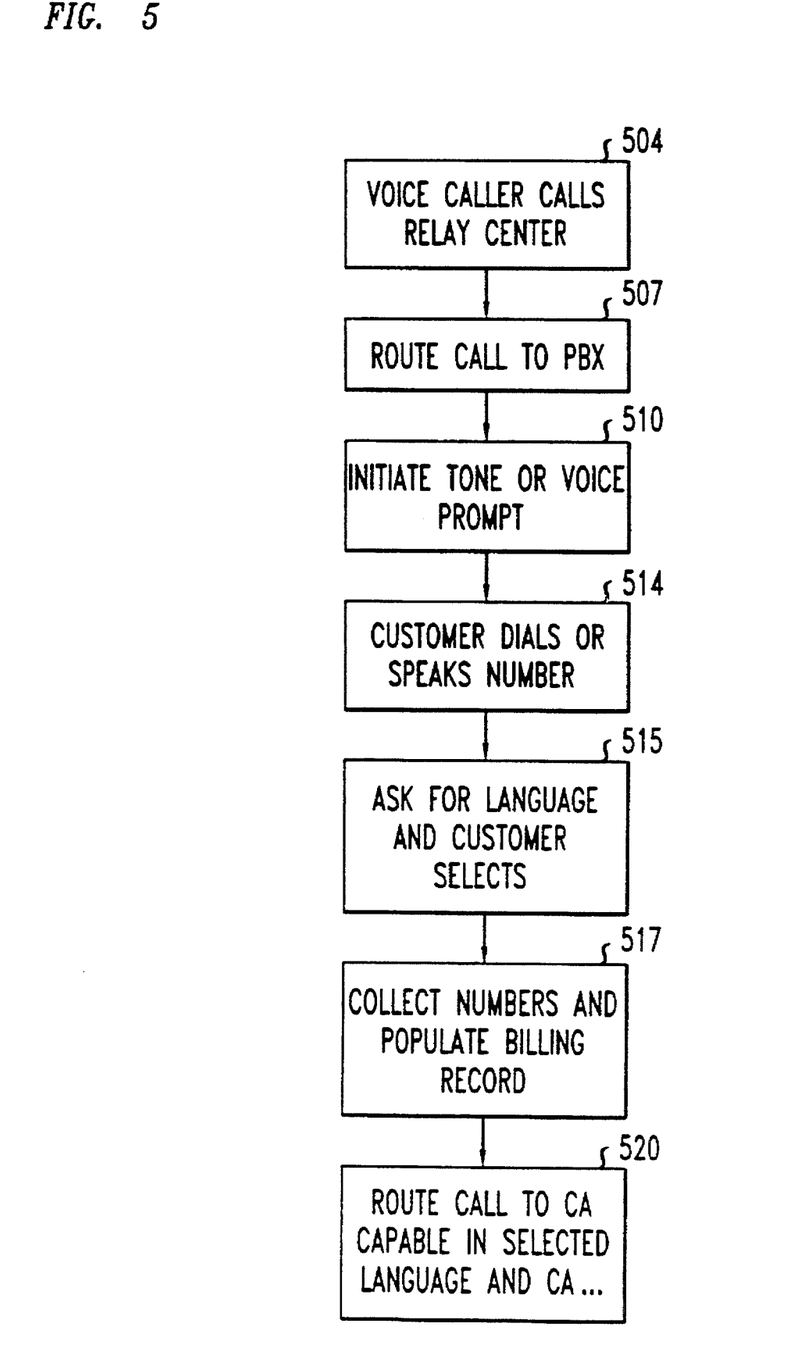
FIG. 5 is a flow diagram of steps performed by the structure of FIG. 1 and embodying the invention for automation of a forward call.

FIG. 5 illustrates the steps when a voice caller calls the relay center. Here, in step 504, the caller calls the relay center. Thereafter, in step 507, the call is routed to the PBX. Then, in step 510, the PBX routes the call to the platform CP1 which answers the call and plays a prompt. The latter may be a dial tone or a voice prompt.

Then, in step 514, the customer dials or speaks the number. In step 515 the customer is asked if he or she wants to communicate in a language other than the default language, e.g. English, and he or she identifies such a language, e.g. by pressing a DTMF (dual-tone multiple-frequency) key, or saying the name of the language for detection by a speech recognition system. Thereafter, the platform CP1 collects the number and populates the billing record in step 517. Then, in step 520, the platform CP1, using the routine in FIG. 7, selects the appropriate-language CA and routes the call to the appropriate-language CA who identifies himself or herself and dials the number with a single button push.

Figure 8:
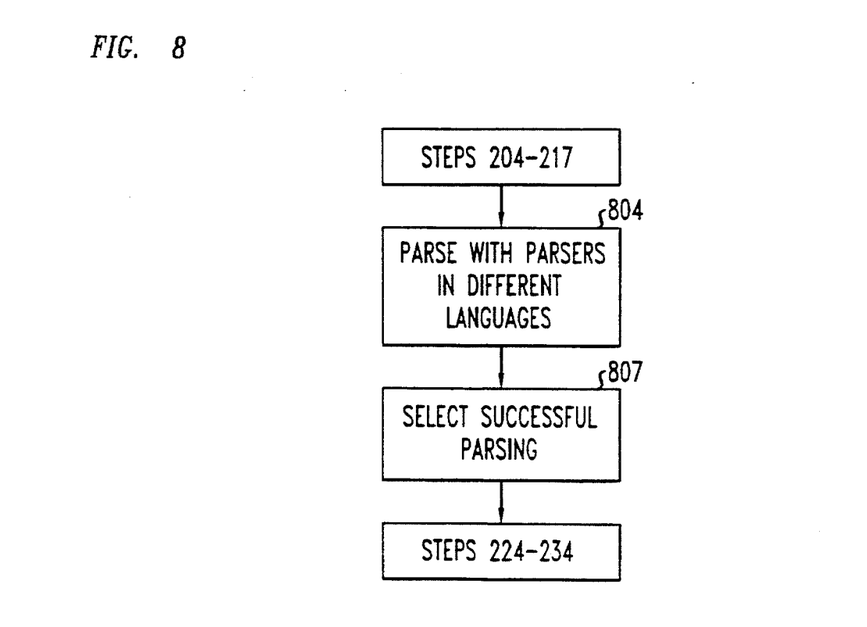
FIG. 8 is a variation of FIG. 2 and shows details of steps embodying the invention.

Another embodiment of the invention appears in FIG. 8. This is a variation of FIG. 2 in which all the steps of FIG. 2 but steps 218 and 220 are the same. Here, in step 804 (instead of steps 218 and 220) the platform CP1 sends the message to a group of different language parsers which parse the message in different languages. In step 807, the platform CP1 identifies the language by selecting the one of the group of language-specific (English, Spanish, etc.) parsers which succeeds in performing the parsing subroutine or program. Thereafter, the platform CP1 proceeds with steps 224 to 234 in FIG. 2.

The following are a number of variations of the arrangements available for use according to the invention.

Here, the CA or communications attendant may also be referred to as a communication assistant, call attendant, or a call agent. The relay may also be called a relay center.

Up-front Automation to Relay Center for TDD users:
Method:
1) User dials into center.
2) User is prompted to type.
3) User types into buffer, completes with "GA".
4) Language is identified as in FIG. 6. Buffer is parsed in identified language as in FIG. 3, forward number and additional information determined.
5) Call is routed to appropriate non-M CA (agent) or M-CA as in FIG. 7, with forward number pre-identified for agent.
6) Agent handles the call.

Up-front Automation to Relay Center for TDD users:
Method:
1) User dials into center.
2) User is prompted for calling information.
3) User types into buffer, completes with "GA".
4) Language is identified as in FIG. 6. Buffer is parsed in identified language as in FIG. 3, forward number determined.
5) Call is routed to appropriate non-M CA (agent) or M-CA as in FIG. 7, with forward number pre-identified for agent.
6) Agent confirms that forward number is correct, floats the call.
7) System dials forward number.
8) When call is answered, call is directed to appropriate agent.
9) Second agent handles the actual call.

Up-front Automation to Relay Center for TDD users:
Method:
1) User dials into center.
2) User is prompted for calling information.
3) User types into buffer, completes with "GA".
4) Language is identified as in FIG. 6. Buffer is parsed in identified language as in FIG. 3, forward number determined.
5) Forward number played to caller for confirmation.
6) Caller confirms or corrects forward number.
7) System dials forward number.
8) When call is answered, call is directed to appropriate non-M CA (agent or M-CA as in FIG. 7.
9) Agent handles the actual call.

Up-front Automation to Relay Center for TDD users:
Method:
1) User dials into center.
2) User is prompted for typing by user; Language is identified as in FIG. 6. prompt allows for special billing (Credit Card, CCC, 3rd party, collect, etc.); prompt is interactive in identified language, one question at a time input is via TDD. Text is parsed in identified language as in FIG. 3, billing record prepared, forward number determined.
3) System dials forward number.
4) When call is answered, call is directed to an appropriate non-M CA (agent) or M-CA as in FIG. 7.
5) Agent handles the call.

Up-front Automation to Relay Center for TDD users:
Method:
1) User dials into center.
2) User is prompted for calling information. Language is identified as in FIG. 6. Prompt allows for special billing (Credit Card, CCC, 3rd party, collect, etc.) prompt is interactive in identified language, one question at a time input is via DTMF (Dual tone, multiple frequency) text is parsed in identified language as in FIG. 3, billing record prepared, forward number determined.
3) System dials forward number.
4) When call is answered, call is directed to appropriate non-M CA (agent) or M-CA as in FIG. 7.
5) Agent handles the call.

Up-front Automation to Relay Center for VOICE users:
Method:
1) User dials into center.
2) User is prompted by system for forward number. Language is identified
3) User enters number using DTMF.
4) Forward number determined.
5) Call is routed to appropriate non-M CA (agent) or M-CA as in FIG. 7, with forward number pre-identified for agent.
6) Agent handles the call.

Up-front Automation to Relay Center for VOICE users:
Method:

1) User dials into center.
2) User is prompted for call information. Language is identified. Prompt allows for special billing (Credit Card, CCC, 3rd party, collect, etc.) prompt is interactive, one question at a time input is via DTMF text is parsed in identified language as in FIG. 3, billing record prepared, forward number determined.
3) System dials forward number.
4) When call is answered, call is directed to appropriate non-M CA (agent) or M-CA as in FIG. 7.
5) Agent handles the call.

Up-front Automation to Relay Center for Voice users:
Method:
1) User dials in to center.
2) User is prompted (via recording) for calling information.
3) User speaks response—forward number collected by ASR (automatic speech recognition). Language is identified.
4) Forward number dialed.

Up-front Automation to Relay Center for both Baudot and Voice callers:
Method:
1) Request language by voice to identify language. Play announcement to caller in voice in identified language that also has Baudot embedded in the announcement.
2) System listens for response (announcement may be barge-in-able).
3) If response is DTMF, assume that caller is voice, and collect digits.
4) If response is Baudot, collect text.
5) If response is voice (speaker independent, connected digit recognizer) collect voice.
6) Dial forward number.

Automation for Relay Calls (general) using an automated operator: Callers who dial 0 are prompted to say "English", Espanol", . . . etc., to identify the language and in that language, prompted to say "operator", "collect" "third party", "person" etc. The recognizer recognizes the call type, then places the call. The recognizer must recognize call progress signals (ringing, reorder, busy, dead line, and even answering machines and fax lines, etc.). A call is routed to appropriate non-M CA (agent) or M-CA as in FIG. 7 as soon as ringing or answer occurs.

Another embodiment of the invention involves "back-end" automation. For Data calls, the system prompts the called party with a modem even before we have an operator on the line. This back-end automation is the flip of front end automation. In front end automation, voice in is harder but the back end automation is easier, since a call occurs to a data device, whereas when the front end automation is for data call in, the call to the forward party is to voice.

Dialing Plan for Relay Center for all users:
Method:
1) Collect digits by one of various methods outlined above.
2) If 7 digits entered, assume call is local to caller area code.
3) If forward number is 10 digits, assume 1+.
4) If forward number is 11 digits, scan first digit
 - if 1, treat as 1+
 - if 0, assume special billing, user gets additional prompts Name-announce feature for TDD to Voice relay calls (used with back-end automation):
Method:
 - when TDD user calls into center, one of optional prompts is to type in name of calling, and/or called party.
 - when call is answered, answering party hears TTS voice announcing who the call is from, and who the call is for.
 - live agent comes on line to handle the call.

Name-announce feature for TDD to Voice relay calls with answer response feature:
Method:
1) when TDD user calls into center, one of optional prompts is to type in name of calling, and/or called party.
 - when call is answered, answering party hears TTS voice announcing who the call is from, and who the call is for.
 - answering party has options via DTMF or voice recognition.
  1=I am that party.
  2=that party is not here.
  3=hold please, I will get that party.
 - live agent comes on line to handle the call, based on response by answering party.

While embodiments of the invention have been described in detail, it will be evident to those skilled in the art that the invention may be embodied otherwise without departing from its spirit and scope.

What is claimed is:

1. A method of relaying a call between a telephone device for the deaf (TDD) and other users, comprising:
 automatically notifying a TDD caller of readiness to receive calling information from a caller;
 receiving caller entered prose calling information;
 automatically analyzing the received prose calling information in a language-identifying parsing routine for parsing prose;
 selecting a communication assistant capable of using a language identified in the analyzing step; and
 automatically routing the call to the selected communication assistant.

2. The method as in claim 1, wherein the step of analyzing includes identifying the language the caller is using and then parsing the prose calling information in one of a plurality of language specific parsers.

3. The method as in claim 1, wherein the step of analyzing includes parsing the prose calling information in a plurality of language specific parsers and selecting a language from the successful one of said parsers.

4. The method as in claim 1, wherein the step of automatically notifying a TDD caller includes receiving the TDD call with a modem in a modem pool.

5. The method as in claim 1, wherein the step of routing the call to the selected communication assistant includes automatically determining whether a communication assistant capable in the identified language is available 6. The method as in claim 2, further comprising entering data into a billing record with at least one of a forwarding number, a billing number, a credit card number, and a calling number.

7. The method as in claim 3, further comprising entering data into a billing record with at least one of a forwarding number, a billing number, a credit card number, and a calling number.

8. The method as in claim 1, further comprising transferring an existing call already being handled by the selected communication assistant from the selected communication assistant when the existing call does not require use of the identified language.

9. The method as in claim 1, further comprising automatically dialing a forward number designated by the caller in the received prose calling information and prompting the communication assistant to handle the call.

10. A method as in claim 1, wherein the step of analyzing includes looking for a go ahead signal.

11. An apparatus for relaying a call between a telephone device for the deaf (TDD) and other users, comprising:

means for automatically prompting a TDD caller for calling information;

means for receiving caller entered prose calling information;

means for automatically analyzing the received prose calling information in a language-identifying parsing routine for parsing prose;

means for automatically selecting a communication assistant capable of using a language identified in the analyzing means; and automatically routing the call to the selected communication assistant.

12. An apparatus as in claim 11, wherein the means for analyzing includes means for identifying the language the caller is using, a plurality of language specific parsers, and means for passing the calling information to the one of a plurality of language specific parsers that parses the prose of the identified language the caller is using.

13. An apparatus as in claim 11, wherein the means for analyzing includes a plurality of means for parsing the prose calling information each in one of a plurality of languages and selecting a language from the successful one of said parser means.

14. An apparatus as in claim 11, wherein the means for automatically notifying a TDD caller includes means for receiving the TDD call with a modem in a modem pool.

15. An apparatus as in claim 11, wherein the means for routing the call to the selected communication assistant includes means for automatically determining whether a communication assistant capable in the identified language is available. ahead signal.

16. An apparatus as in claim 11, wherein the means for analyzing includes means for looking for a go ahead signal.

17. An apparatus as in claim 11, further comprising means responsive to said received prose calling information for entering data into a billing record with at least one of a forwarding number, a billing number, a credit card number, and a calling number.

18. An apparatus as in claim 11, further comprising means for transferring an existing call already being handled by the selected communication assistant from the selected communication assistant when the existing call does not require use of the identified language.

19. An apparatus as in claim 11, further comprising means for automatically dialing a forward number designated by the caller in the received prose information and prompting the communication assistant to handle the call.

* * * * *